United States Patent [19]
Westrom et al.

[11] Patent Number: 5,341,265
[45] Date of Patent: Aug. 23, 1994

[54] METHOD AND APPARATUS FOR DETECTING AND RESPONDING TO DOWNED CONDUCTORS

[75] Inventors: Arthur C. Westrom, Stone Mountain; A. P. Meliopoulos, Atlanta, both of Ga.; George J. Cokkinides, Irmo, S.C.

[73] Assignee: Kearney National, Inc., Atlanta, Ga.

[21] Appl. No.: 94,400

[22] Filed: Jul. 20, 1993

Related U.S. Application Data

[63] Continuation of Ser. No. 530,602, May 30, 1990, abandoned.

[51] Int. Cl.$^5$ .............................................. H02H 3/16
[52] U.S. Cl. ...................................... 361/44; 361/47; 361/66; 361/86; 361/81
[58] Field of Search ................. 361/65, 66, 68, 69, 361/86, 87, 92, 64, 48, 50, 47, 44, 82

[56] References Cited

U.S. PATENT DOCUMENTS

| | | | |
|---|---|---|---|
| 4,389,694 | 6/1983 | Cornwell, Jr. | 361/48 |
| 4,935,837 | 6/1990 | Sun | 361/64 |

*Primary Examiner*—Todd Deboer
*Attorney, Agent, or Firm*—Deveau, Colton & Marquis

[57] ABSTRACT

A system for detecting a high impedance fault in a phase conductor having a potential device connected to the phase conductor, the system including a signal injection device having an input from the potential device which detects a reduction in voltage at the phase conductor and outputs a first signal in response to detecting a reduction in voltage at the phase conductor and a signal receiver which receives the first signal and provides a second signal to an interruption device in response to having received the first signal to cause the interruption device to open the circuit to the phase conductor.

39 Claims, 10 Drawing Sheets

METHOD AND APPARATUS FOR DETECTING AND RESPONDING TO DOWNED CONDUCTORS

This is a continuation of copending application(s) Ser. No. 07/530,602 filed on May 30, 1990, now abandoned.

BACKGROUND OF THE INVENTION

A. Field of the Invention

The present invention relates to a method and apparatus for detecting and responding to downed conductors in a power distribution system. More specifically, the present invention is a system for detecting a fault in a power conductor and in response thereto opening the circuit to the faulted power conductor. The system can be designed to provide either a single phase response or a three phase response to the detected fault.

B. Description of Related Art

The electrical power that runs today's modern society is typically generated in rural areas because of real estate restraints, environmental concerns and cooling water availability. In contrast, most load consumption is in large urban areas far removed from generating stations. A network of high voltage, three phase transmission lines operating at 230 kV to 765 kV connects rural generating stations with urban load centers. In addition, most power systems have a second, lower voltage subtransmission system used to transmit smaller blocks of power to regional load centers. Subtransmission voltages typically range from 4600 volts and 138,000 volts.

A distribution system transmits power from subtransmission facilities to power consumers, such as residential and commercial users. The distribution system operating at 4.6 kV to 35 kV typically provides power to the customer as a single phase line operating at 120 to 240 volts. The principal components of the overhead distribution system are commonly poles, hardware, an energized phase conductor (i.e., power conductor) and a neutral return conductor.

Distribution transformers of 5 kV, 15 kV, 25 kV, 35 kV class are connected between the energized phase conductor and the grounded neutral conductor. A medium voltage fuse connected between the distribution line and the medium voltage transformer, provides protection against short circuits in the transformer without affecting other consumers.

Branch line installations are the typical means for interconnecting the distribution systems. Single phase branch lines may also be individually equipped with devices which function like circuit breakers, called "reclosers". Reclosers help to ensure that a problem on any of the branch circuits does not affect the entire line. Branch lines usually have no alternate means of supply.

Main three phase lines, called feeders, originate at a substation and usually end at a normally opened switch. The normally opened switch is a tie point to another feeder to provide an alternate source of power. This flexibility increases the reliability of the system while allowing minimal inconvenience to consumers during system maintenance. Feeders serve a well defined area, with single phase branch lines tapped off the main line.

Faults which interrupt the flow of power to consumers are a recurring problem and a constant concern for utility companies. There are a number of different types of faults involving actual contact between power conductors. Single phase faults are the most likely to occur, and are therefore of the greatest concern to electrical utilities. For example, a phase conductor can break loose from its support and fall to the ground, causing a phase-to-ground fault. Fault current will flow from the substation transformer, through the faulted conductor and the earth where the conductor fell, and back to the substation via the parallel path consisting of the earth and the neutral. At first it seems that detection of such faults should be relatively straight forward because a short circuit involves only one phase and ground. This is not true.

Design of a reliable system to detect faults to earth is a task beyond the best technology available until the present invention. The quantity which makes this problem so difficult is that earth impedance at the point of fault can be large enough to limit fault current to below the level at which it can be detected. The majority of detection schemes in use on distribution systems today measure current magnitude as a problem indicator. This method is not foolproof because the current which flows as a result of a phase-to-ground fault is not predictable. Some phase-to-ground faults result in large current flow, while others cause virtually none. The following examples illustrate this unpredictability.

Consider a typical 7200 volt single phase distribution line under normal circumstances serving 100 residents where each resident has a load of 30 amperes at 240 volts. For simplicity, it is appropriate to assume this load to be all resistive. The total load current is: $I = 30$ amperes $\times 100$ houses $= 3000$ amperes at 240 volts. This current may be converted to a 7200 volt base by multiplying by the transformer ratio to obtain 100 amperes at 7200 volts.

Consider this same system operating with a short circuit. Several factors must be included to calculate the amount of current which will flow. The impedance of equipment between a generator and the station limits the current available at the source distribution station. A typical source impedance of 1 ohm is assumed, which would provide available fault current of 7200 amperes at the source station. Most faults do not occur right at the substation. Thus, a 1 ohm impedance for the distribution line should be included in any calculation of fault current. One ohm corresponds to approximately a mile of overhead line. The magnitude of the short circuit current between the phase conductor and the neutral is determined by dividing the source voltage by the sum of impedances between the source and the fault. The amount of resistance between the source and the fault would be the summation of three impedances, one ohm for the source, one ohm for the phase line and one ohm for the neutral. Thus, the short circuit current would be:

$$I = \frac{V}{Z} = \frac{7200 \text{ V}}{3 \, \Omega} = 2400 \text{ amperes}$$

Overcurrent devices that respond to current flow are used by electric utilities to detect and remove such faults. These devices isolate a circuit when high values of current flow through them. They must not isolate the circuit when normal values of load current are flowing. There is no difficulty sensing the short circuit, 2400 amperes, while at the same time not responding to load current, 100 amperes.

The problem of sensing downed conductors adds another dimension to this problem. Consider the same system as above, a station generating 7200 volts with a one ohm source resistance and one ohm line and neutral resistances but now include fault impedance typical of real life downed conductor situations. Tests have shown that a downed phase conductor may encounter approximately 75 ohms of impedance at the fault point. This is the resistance to current flow through the earth. Actual values of fault impedance may be lower but are frequently higher. The short circuit current value for this situation is:

$$I = \frac{V}{R} = \frac{7200 \text{ V}}{78 \, \Omega} = 92 \text{ amperes}$$

An over current device protecting this circuit must not operate for the load current of 100 amperes. With that constraint the need to operate for a 92 ampere fault poses a serious problem. This simplified example is indicative of the problem facing the electric utility industry. See generally, *Downed Power Lines: Why They Can't Always Be Detected*, IEEE Power Engineering Society, Feb. 22, 1989; and *Detection of Downed Conductors on Utility Distribution Systems*, IEEE Tutorial Course, Course Text 90 EH 0310-3-PWR.

Downed conductors can also pose a problem in three phase distribution systems. Most industrial and commercial customers use three phase circuits to provide electrical service to their facilities. The typical service contract between the utility and a customer does not guarantee three phase service largely because single pole fuse cutouts are used, which cutouts respond to a single phase overcurrent by interrupting current to a single phase. In recognition of this, industrial and commercial customers typically employ three phase switching and interrupting devices to provide a three phase response to a voltage imbalance. A severe imbalance can cause early failure of many types of electrical motors. Customers with smaller loads and equipment may not invest in the cost for under voltage protection and gamble that a single phase fault will not occur. Accordingly, there is a need for an economical way to provide a three phase response to fault on a single phase.

SUMMARY OF THE INVENTION

In light of the previously mentioned difficulties in using currently available technology to respond to downed conductors there is a need for a method and apparatus capable of sensing downed conductors drawing phase-to-ground fault currents well within normal operating ranges. The needed device should respond to a downed conductor by activating conventional current interruption devices to open the circuit to the downed power conductor. There is also a need for a current interrupting device which will provide a three phase response to a single phase fault.

The present invention achieves the necessary objectives by monitoring the voltage level at a phase conductor in a distribution system, detecting a fault in the phase conductor in the system by detecting a reduction in the voltage in the phase conductor, outputting a signal whenever a reduction in voltage falls below a selected voltage threshold for more than a selected time duration, detecting the outputted signal and activating an interruption device in response to the outputted signal to cause an opening in the circuit to the faulted power conductor.

Generally, the method of the present invention is carried out by two devices. A signal injection or outputting device, sometimes also referred to herein as a transmitter, monitors the voltage level at the conductor, detects a fault in the conductor and outputs a signal in response to the detection of a fault. A receiver detects the outputted signal and causes an opening of the circuit to the faulted conductor.

Both single phase and three phase applications are allowed by the present invention. In a single phase application the signal outputting device is coupled with a distribution transformer on a single phase conductor while the receiver is coupled with another distribution transformer upstream from the transmitter. In a three phase application, one transmitter monitors the voltage on all three phase conductors and the receiver is designed to cause an opening of one, two or all three circuits connected to the three phase conductors.

In its preferred embodiment, the signal receiver is designed to initiate and action to blow the single phase fuse or to initiate the opening of a circuit breaker upon receipt of a signal from a downstream signal injection device or transmitter activated by the occurance of an open conductor under high impedance fault conditions. Voltage at the conductor is monitored by dual potential devices, redundantly, to verify voltage availability to prevent false activation in the event voltage loss was upstream and therefore for some other reason. The signal receiver performs its function by activating the closing of a ground switch to blow the fuse. Alternately, it can momentarily close a contact to cause the opening of a three phase breaker or automatic circuit recloser. A current tapped device tuned to the frequency of the injected signal blocks propagation upstream to the next receiver location.

The signal injector is designed to inject a discrete signal into the neutral conductor when an open primary conductor results in a loss of monitored voltage for a preselected minimum time. Voltage loss is monitored by dual high voltage potential devices such as resistors and/or distribution transformers. Signal energy required is stored in a capacitor. A high voltage resistor having as an output a low voltage transformer to supply 120 volts is used in combination with a typical distribution transformer to also supply 120 volts. Both potential devices must evidence required minimum reduced voltage to enable the signal injection device. The redundancy provided by two potential devices prevents false signaling which would occur if a single device were to fail in the open mode as, for example, the blowing of the transformer fuse.

Alternately, the transmitter, which detects the reduction in voltage at a conductor, may be designed to close a contact in a communications link, and the receiver/detector may be designed to detect the closing of the contact and cause an opening in the circuit to the conductor. The communications link may take various forms, including, for example, a fiber optic cable, a radio link or telephone wires. These alternate embodiments are particularly useful in those areas where distribution systems do not employ a neutral conductor.

Each transmitter may be set to inject a unique signal. Each receiver/detector may be set to be matched with a single transmitter or with several transmitters. This allows each receiver/detector to determine which conductor has faulted, where the fault occurred, and to decide whether or not to activate a current interruption device.

The present invention is intended to work with all conventional current interruption devices, such as single phase cutouts, circuit reclosers, circuit breakers and ground switches. The present invention will also operate with the three phase fuse disclosed herein. Further, the present invention can provide a single phase response or a three phase response to a single phase fault.

The three phase fuse cutout can operate to open the circuits to all three phases of a feeder branch in response to an open conductor on a single phase. The three phase cutout includes three single pole fuse cutouts mounted on a cross-arm in side-by-side fashion with each fuse cutout individually connected to a single phase conductor. A rotatable latch rod is mounted adjacent to and in the rear of the service terminals of the three fuse cutouts. Rigidly attached to the latch rod is a grounding bar associated with a grounding wand for each of the three cutouts. The grounding bars are biased to be open and are positioned to have air insulation from their associated grounding wands. When the latch rod is released, grounding bars are allowed to rotate downwardly to engage the grounding wands.

The latch rod holding the grounding bars open is released mechanically on the melting of a fuse link in the cutout or is released electrically by an optional solenoid associated with the receiver of the present invention. When the latch rod is released on the melting of a fuse link, the contact of the grounding blades with the grounding wands initiates a high current ground fault to promptly blow all unblown fuse links. Thus, the three phase cutout fulfills the dual purpose of: a) preventing single phasing to three phase customers when there is an open conductor; and b) preventing single phasing to three phase customers when only one fuse is blown due to a single phase fault. Unlike conventional cutouts, the three phase cutout will operate in response to both high current and low current situations.

DETAILED DESCRIPTION OF THE PREFERRED EMBODIMENT

Turning now to the figures in which like numerals denote like parts, a preferred embodiment of the present invention can be seen.

Figure 1A:
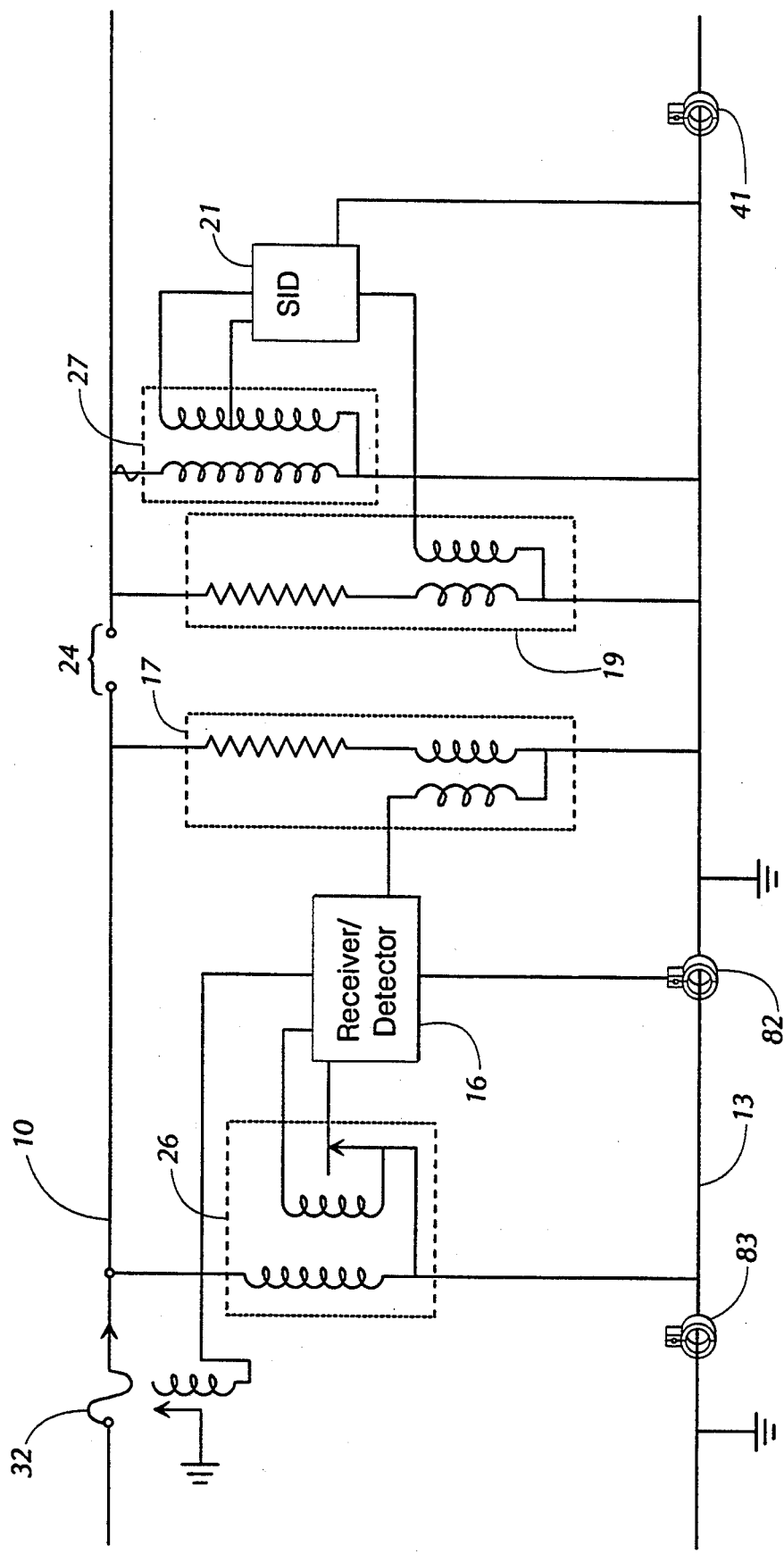
FIG. 1a is a schematic diagram of the downed conductor apparatus of the present invention in place in a single phase distribution system.

FIG. 1a illustrates the connection of the downed conductor apparatus of the present invention into a single phase distribution system. The distribution system consists of a single phase power line 10, and its associated neutral conductor 12, which is multiply grounded along its length. A distribution power transformer 26 is interconnected between single phase power conductor 10 and neutral conductor 12. A current interruption device 32 is connected in series between single phase conductor 10 and distribution transformer 26.

The downed conductor detection system of the present invention consists of at least one receiver/detector and at least one signal injection device or transmitter. The configuration of the downed conductor system illustrated in FIG. 1a consists of a single receiver/detector 16 and a single signal injection device 21. The configuration shown is capable of monitoring a length of phase conductor 10 measuring 5 miles or more. The exact number of signal injection devices and receivers/detectors inserted into a distribution system varies depending upon the configuration of the particular distribution system. Those skilled in the art will understand that the downed conductor apparatus of the present invention may be practiced with any number of variations.

Signal injection device 21 connects to single phase conductor 10 through the secondary tap of its associated distribution transformer 27. Signal injection device or transmitter 21 associates with neutral conductor 12 through current tapping transformer 41. A high-voltage potential device 19 is placed parallel to distribution transformer 27. Potential device 19 consists of a high-voltage resistor assembly including a series transformer. The secondary tap of the series transformer of device 19 connects to signal injection device 21. A potential device such as that manufactured by S & C Electric Company Model 581-30 having an integral series transformer is preferred.

Receiver/detector 16 is likewise connected to single phase conductor 10 through the secondary winding of its associated distribution transformer 26. Another high-voltage potential device 17 connects between phase conductor 10 and neutral conductor 12. The secondary tap of the series transformer of potential device 17 is fed to receiver/detector 16. Receiver/detector 16 associates with neutral conductor 12 through current tap transformer 82.

The downed conductor apparatus of the present invention responds to a fault on single phase conductor 10 as follows. Signal injection device 21 responds to a downed conductor after the voltage level on phase conductor 10 falls below the signal injection device's uniquely selected voltage threshold for a period equal to or greater than the signal injection device's uniquely selected duration threshold and the voltage level from potential device 19 falls below that level as well. Thus, it is seen that potential device 19 provides redundancy which prevents signal injection device 21 from incorrectly signalling a break or opening 24 in conductor 10 when distribution transformer 27 fails open such as on the blowing of the transformer fuse. Use of both potential device 19 and transformer taps increases the reliability of the downed conductor apparatus of the present invention. However, the present invention can also operate by monitoring the single voltage on a single device. Once signal injection device 21 detects the downed conductor it will inject a uniquely encoded signal into neutral conductor 12 through current tapping transformer 41 which signal will propagate along the neutral conductor. The frequency of the encoded pulse will vary depending upon the frequency uniquely selected for the signal injection device 21. This allows the receiver/detector 16 to cause an opening of the circuit only in response to an actual break 24, and not to noise on neutral conductor 12.

Given a 10 ohm impedance to ground at the end of the distribution branch, assuming signal strengths on the order of 15 to 35 decibels and a neutral driving impedance in the range of 40 to 150 ohms, an injected signal can be detected by a receiver/detector 16 as far away as five miles from signal injection device 21. A second current tapping transformer 83 associated with neutral conductor 12 blocks injected signals from propagating any further along neutral conductor 12. As will be described in more detail hereinbelow, receiver/detector 16 activates solenoid 14 in response to a detected signal. In one embodiment solenoid 14, in turn, activates current interruption device 32 to open the circuit to conductor 10. Those skilled in the art will understand that solenoid 14 may operate any conventional current interruption device.

Figure 1B:
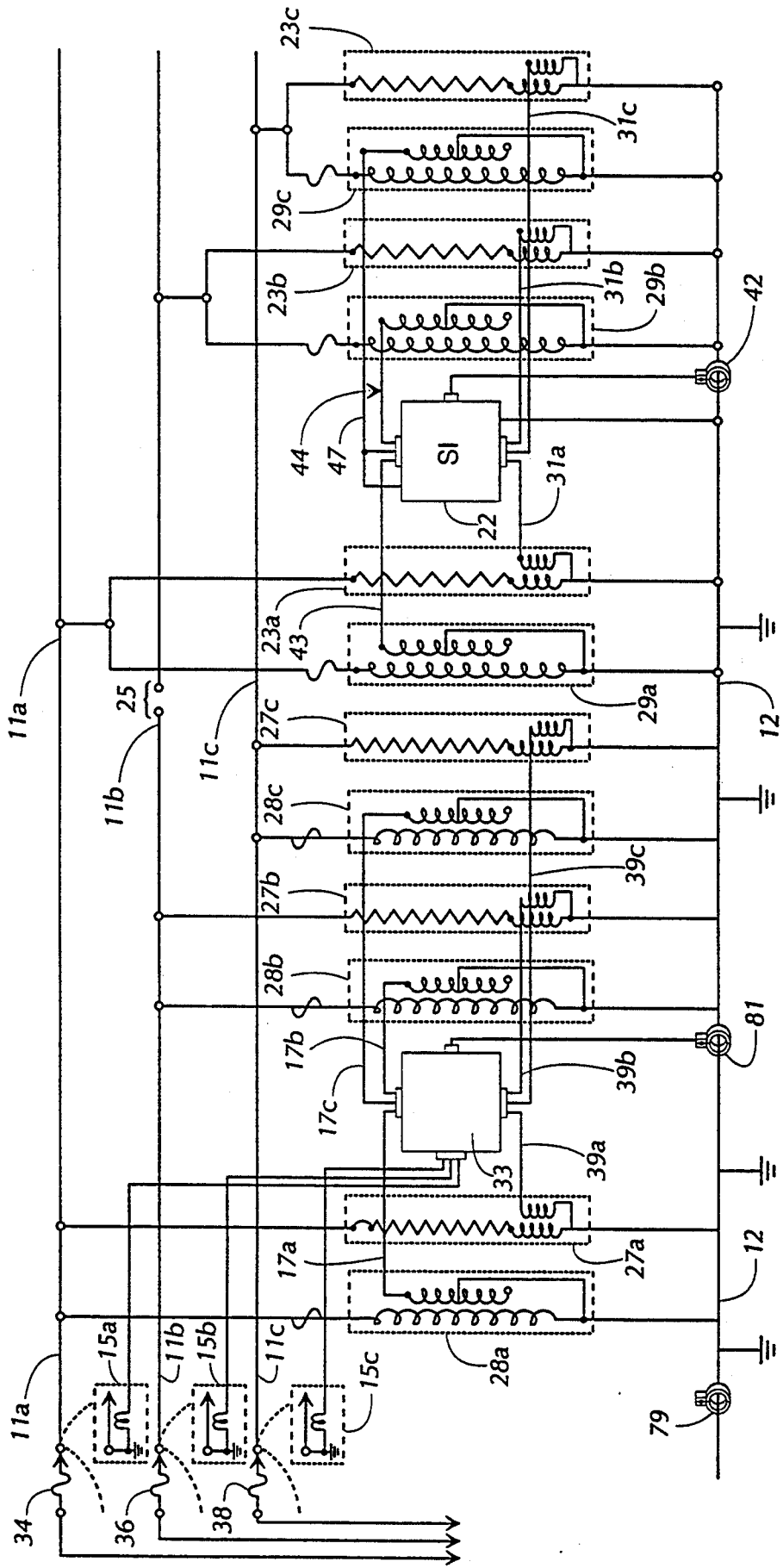
FIG. 1b (righthalf) and 1b (lefthalf) show a schematic diagram of the downed conductor apparatus of the present invention in a three phase distribution system.

Turning now to FIG. 1b, the downed conductor apparatus of the present invention can be seen in an embodiment adapted for use in a three phase distribution system. The distribution system consists of three single phase conductors 11a, 11b, 11c and their associated neutral conductor 12, which is multiply grounded. On the side of receiver/detector 33, distribution transformers 28a, 28b and 28c connect between each phase 11a, 11b or 11c and neutral conductor 12. Similarly, on the side of signal injection device 22, distribution transformers 29a, 29b and 29c extend between each phase conductor 11a, 11b and 11c and neutral conductor 12.

Three phase signal injection device 22 monitors the voltage level of each phase conductor 11a, 11b and 11c through its connection to the secondary windings 43, 44 and 47 of each distribution transformer 29a, 29b and 29c. Signal injection device 22 also monitors the voltage level of phase conductors 11a, 11b and 11c through its connections, 31a, 31b and 31c to the series transformers included in potential devices 23a, 23b and 23c. Each potential device 23a, 23b and 23c extends between a single phase conductor 11a, 11b or 11c and neutral conductor 12. Signal injection device 22 injects encoded signals into neutral conductor 12 using current tapping transformer 42.

Three phase receiver/detector 33 connects into the distribution system in a similar fashion. Receiver/detector 33 is associated with each phase 11a, 11b and 11c through both a distribution transformer 28a, 28b or 28c and a potential device 27a, 27b or 27c. Each distribution transformer 28a, 28b and 28c and every potential device 27a, 27b and 27c is connected between a signal phase conductor 11a, 11b or 11c and the neutral conductor 12.

Receiver/detector 33 detects an encoded signal propagating through neutral conductor 12 using current tapping transformer 81. Encoded signals are prevented from propagating any further by blocking transformer 79, which encircles neutral conductor Current interruption devices 34, 36 and 38 are inserted in series with each phase conductor 11a, 11b and 11c. Each current interruption device 34, 36, 38 can be operated to cause an opening in the circuit to one or more of the conductors by receiver/detector 33 by activating the appropriate solenoid 15a, 15b or 15c. Where a three phase response to detection of an open conductor is desired, all three solenoids are activated simultaneously by receiver/detector 33. Current interruption devices 34, 36 and 38 may be any conventional device, such as those described earlier.

In its three phase embodiment, the downed conductor apparatus operates as follows. Signal injection device 22 will detect break 25 in single phase conductor 11b, for example, when two events occur concurrently. First, signal injection device 22 must sense that the voltage level from distribution transformer 29b has fallen below a preselected voltage threshold for a period of time exceeding a preselected duration threshold. Second, signal injection device 22 must also sense that the voltage level from potential device 23b has fallen below the preselected voltage threshold for a period of time exceeding the preselected time duration. The use of potential device 23b ensures that signal injection device 22 will not incorrectly signal a break when distribution transformer 29b has failed open.

When both conditions occur, signal injection device 22 injects a uniquely encoded signal into neutral conductor 12 via current tapping transformer 42. Three phase receiver/detector 33 detects the encoded pulse propagating through neutral conductor 12 using current tapping transformer 81. Receiver/detector 33 verifies voltage availability by monitoring potential devices 27a, 27b and 27c. This prevents receiver/detector 33 from incorrectly circuiting a current interrupting device. Receiver/detector 33 can respond to the signal in two different manners. Receiver/detector 33 can provide a single phase response to the single phase fault by activating only solenoid 15b. Alternatively, for example, when the distribution system serves an industrial customer, receiver/detector 33 provides a three phase response to the single phase fault on 11b by activating solenoids 15a, 15b and 15c.

Figure 2:
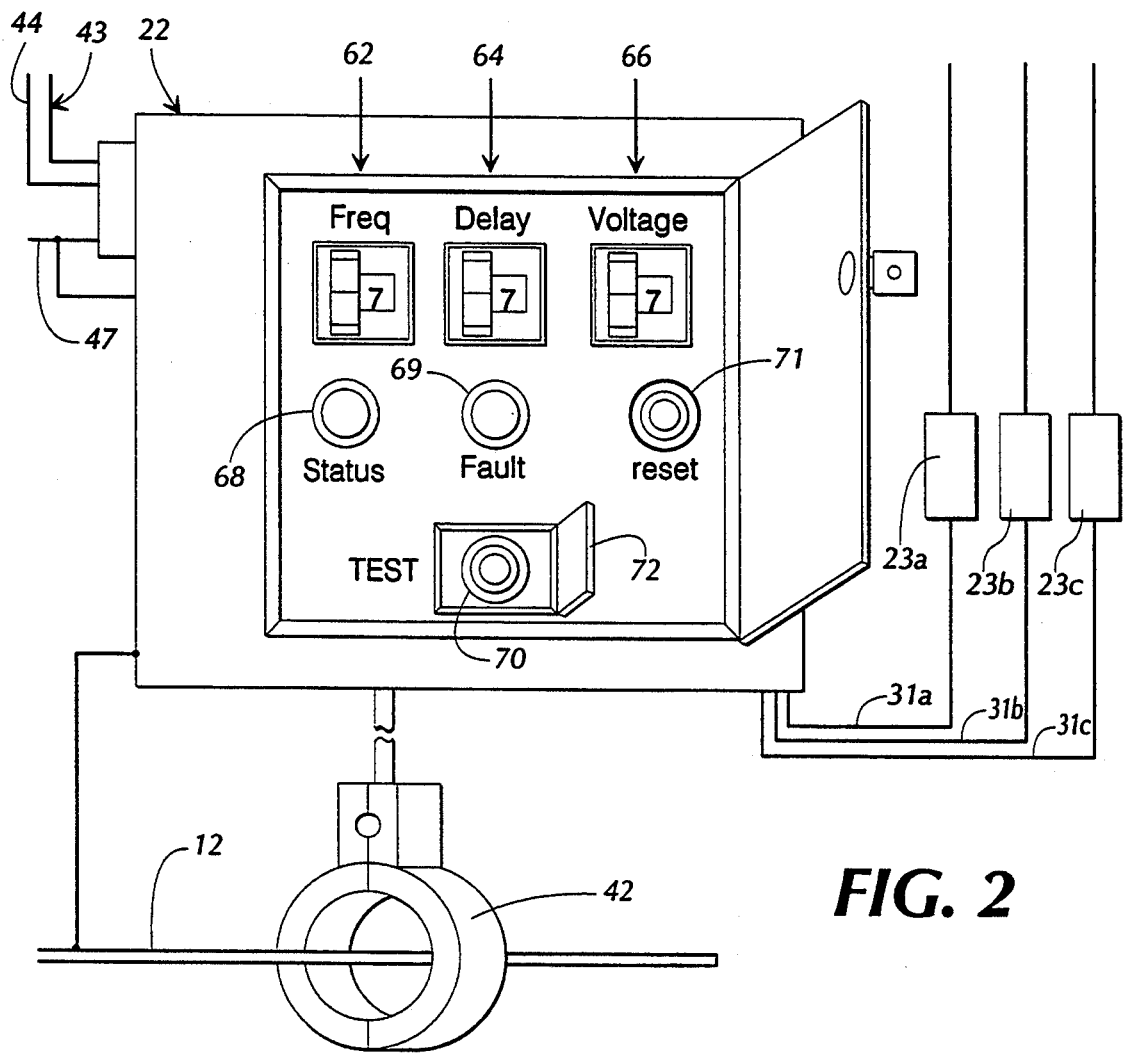
FIG. 2 illustrates a three phase example of the connection of the downed conductor transmitter of the present invention to a distribution transformer and the neutral conductor.

FIG. 2 illustrates the front panel of signal injection device 22 and its connection into the distribution system shown in FIG. 1b. The front panel of signal injection device 21 is analogous for the single phase application in FIG. 1a as opposed to the three phase application of FIG. 1b, and therefore, is covered by the discussion hereinbelow. Signal injection device 22 monitors the voltage levels at single phase conductors 11a, 11b and 11c via taps on the secondary windings 43, 44 and 47 of distribution transformers 29a, 29b and 29c and on the taps of secondary windings 31a, 31b and 31c of the series transformers of potential devices 23a, 23b and 23c. Signal injection device 22 is able to inject a signal even after power from the 120 tap 47 drops by using large storage capacitors in its power supply circuits. Single-phase lines enter signal injection device 22 through a bushing, which prevents the conductors from rubbing together and shorting out.

Signal injection device 22 injects its signal into neutral conductor 12 through current tapping transformer 42. The core of current transformer 41 consists of two semi-circular pieces connected by a spring loaded hinge, thus allowing current transformer 42 to be installed without interruption of neutral conductor 12.

Signal injection device 22 includes frequency selector 62, which allows the frequency of the signal injected into neutral conductor 12 to be uniquely selected according to relevant distribution system design considerations. Frequency selector 62 may be a thumbwheel binary coded decimal (BCD) switch, which preferably allows the frequency to be set at one of the following values:

8, 9, 10, 11, 12, 13, 14, 15, 16 or 17 KHZ.

Signal injection device 22 includes two additional front panel thumbwheel BCD switches 64 and 66 used to set the duration threshold and the voltage threshold, respectively. Delay selector 64 preferably allows the duration threshold to be set at one of the following values: 0.1, 0.2, 0.4, 0.8, 1.6, 3.2, 6.4, 12.8, 25.6 or 51.2 seconds. Similarly, voltage selector 66 allows the voltage threshold to preferably be set at one of the following values: 0.5, 0.6, 0.7 and 0.8 pu.

Optionally, the front panel of signal injection device 22 may incorporate status light 68 and fault light 69. Status light 68 is a light emitting diode (LED), which glows green when all transmitter power supplies are charged. Fault light 69, a red LED, comes on when signal injection device 22 detects a low voltage on one of the monitored lines 11a, 11b or 11c. Fault light 69 will remain red until it is reset by pushing reset switch 71. Signal injection device 22 has one-shot operation.

The final element on the front panel of signal injection device 22 is test switch 70, which causes a signal to be injected into neutral conductor 12 without the detection of a downed conductor, allowing the operability of both the signal injection device 22 and associated receiver to be tested. Obviously, a means for verifying the operability of the receiver must be provided for which does not interrupt the power to residential and consumer users. The present invention provides for such a response which will be discussed in more detail herein below. Because of the potential interruption of power to consumers when test button 70 is pushed without first placing receiver 16 in a test mode, test button 70 is equipped with a cover 72 to prevent test button 70 from being depressed accidently.

Figure 3:
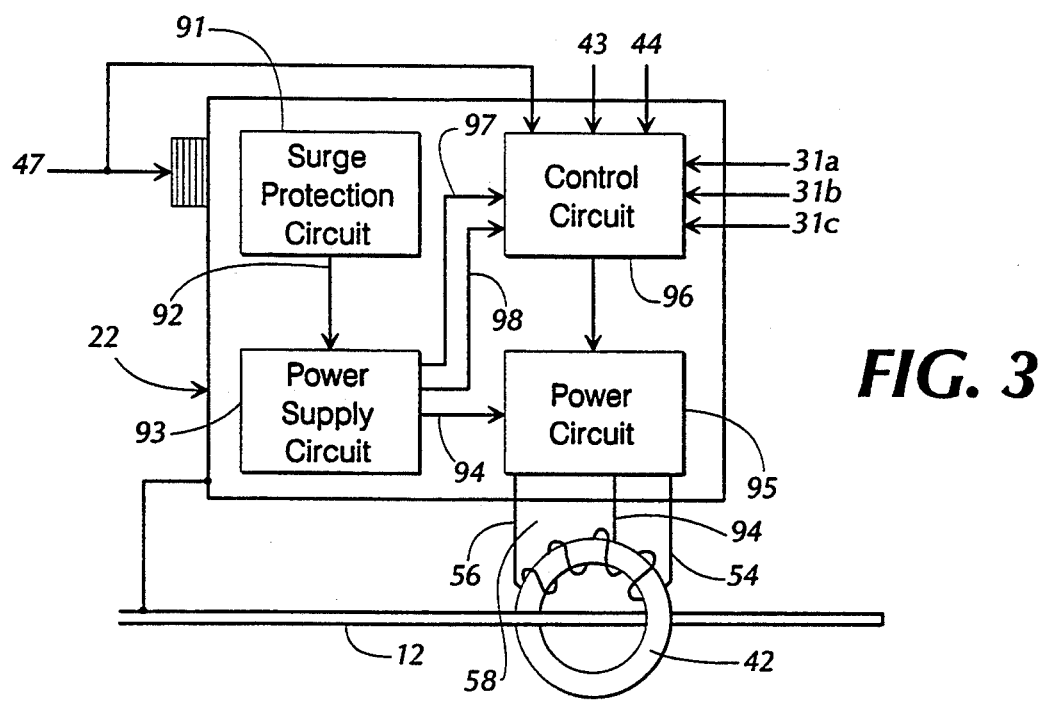
FIG. 3 is a block diagram of the downed conductor transmitter of FIG. 2.

FIG. 3 is a block diagram of the circuitry incorporated in signal injection device 22. Power from a 120 V tap 47 enters signal injection device 22 through surge protection circuit 91, which attenuates any surges present in the hostile environment in which the transmitter is placed. Surge protected output 92 is the AC source for power supply circuit 93. The power supply circuit stores the energy used to operate the transmitter. Power supply circuit 93 generates three DC voltage levels, 5 V 97, 12 V 98, and 170 v 94. The 170 V DC output 94 is connected to power output circuit 95. Both 5 V level 97 and 12 V level 98 are supplied to control circuit 96 which performs two tasks. First, control circuit 96 directly monitors a set of three phase lines 11a, 11b and 11c, via taps 43, 44 and 47 and a set of potential devices 31a, 31b and 31c, or a single line 10 for loss of voltage, permitting signal injection device 22 to be used in either single phase or three phase applications. Second, once the control circuit 96 detects a loss of voltage, it generates a signal to the power circuit 95 activating the power circuit to send a signal to the current coupling device 42. The coupler 42 is designed to saturate against high short circuit currents in the neutral line 12 due to power faults. The signal injection device 22 in its preferred form employs a conventional push/pull design. The parallel branching of tap 47 to provide inputs to both the surge protection circuit and the control circuit can be provided either internally or externally of signal injection device 22.

Figure 4:
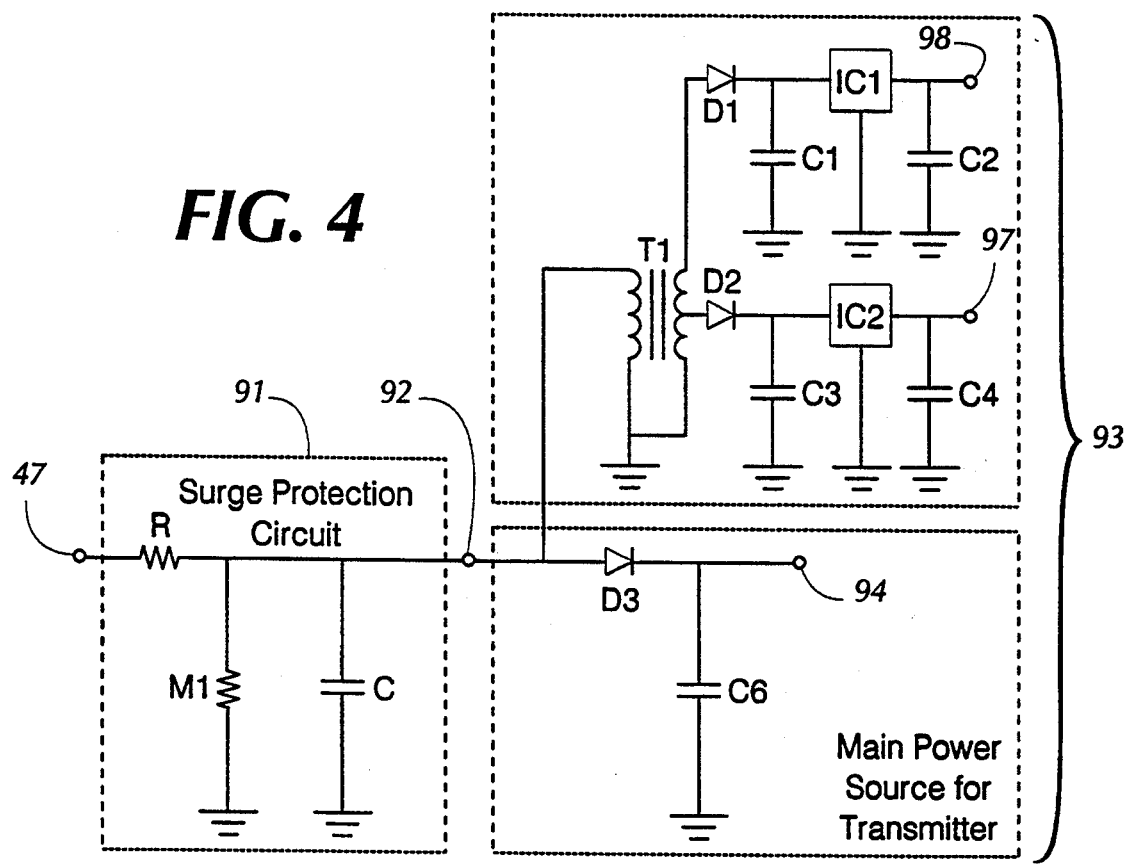
FIG. 4 is a schematic diagram of the surge protection and the power supply circuits for the downed conductor transmitter of FIG. 2.

FIG. 4 is a circuit diagram of the surge protection circuit 91 and power supply circuit 93 used in signal injection device 22. Surge protection circuit 91 attenuates any power surges on phase conductor 47. Surge protection circuit 91 includes a low pass filter with a variable resistance. Metal-oxide varistor type (MOV) M1 is a variable resistance device, whose resistance decreases with increased applied voltage. Thus, MOV M1 prevents large transient pulses at input 47 from showing up at connection 92 and harming the circuitry which follows. Surge protected output 92 is then fed to power supply circuit 93.

The first section of power supply circuit 93 develops the 170 V DC supply 94 used to drive current transformer 42. This section of power supply circuit 93 is a simple conventional AC-DC convertor consisting of a diode D3 and a capacitor 6.

The remainder of power supply circuit 93 is likewise a conventional AC-DC converter. Transformer T1 steps down the voltage to levels more compatible with digital and linear devices. Diodes D1 and D2 rectify the output of $T_1$ and then conventional digital circuitry converts the time varying voltage into constant DC levels output at 98 and 97 through use of voltage regulators IC1, IC2.

Figure 5:
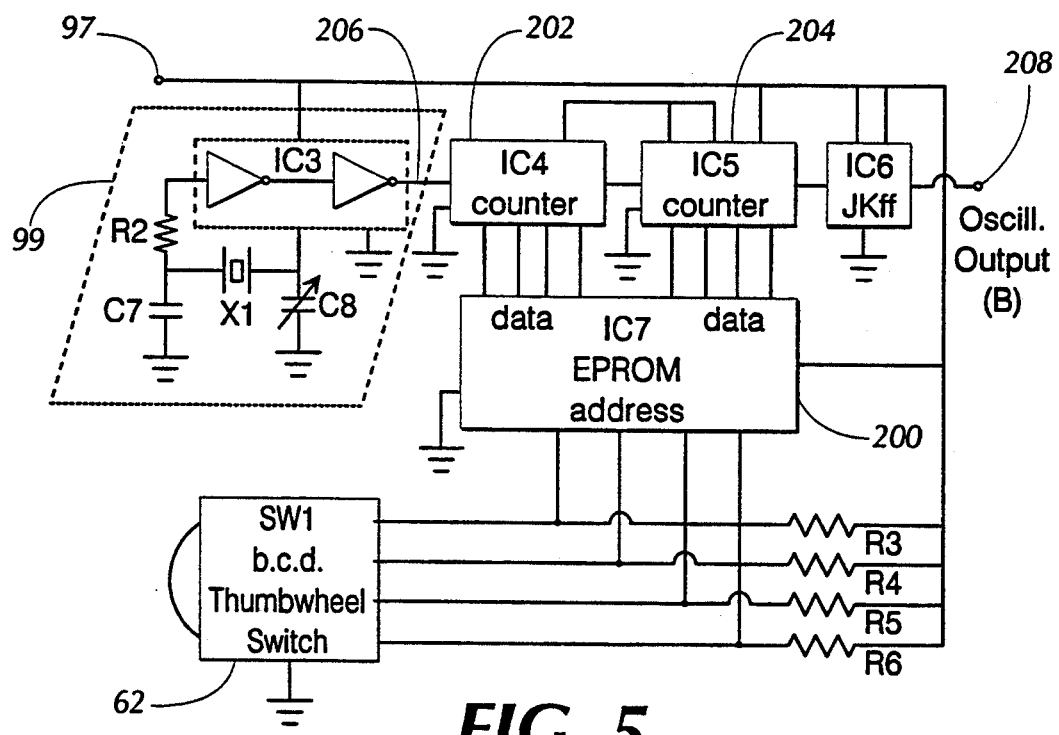
FIG. 5 is a schematic diagram of a portion of the control circuit for the downed conductor transmitter of FIG. 2.

Turning now to FIG. 5, the portion of the control circuit 96 which generates the reference frequency for signal injection device 22 may be seen. Frequency selector 62, a thumbwheel BCD switch, generates and Outputs a binary coded decimal signal indicating the address of the reference frequency in EPROM 200. EPROM 200 appropriately loads counters 202 and 204 by outputting the proper data on its data lines. Counters 202 and 204 divide down the 1-8432 MHz reference frequency 208 from oscillator 99 including a quartz crystal oscillator X1 operating preferably at 1.8432 MHZ, to reach the selected reference frequency. The EPROM 200 and counters 202, 204 serve to scale down the frequency output from oscillator 99 to match the frequency set by the user with thumbwheel switch 62. EPROM 200 may be programmed in any number of ways to achieve this function. Flip-flop 1C6 varies the oscillation output between positive and negative values. The digital circuit techniques shown in FIG. 5 provide very precise control over the frequency output at 208. Any conventional frequency generation scheme may be used, as well as that shown, as would be understood by those skilled in the art.

The unique frequency used by each transmitter is manually set using BCD thumbwheel switch 62. This selected unique frequency allows each receiver that receives the signal injected and propagated upon detection of a loss or reduction in voltage to determine whether or not to activate a current interruption device.

Figure 6:
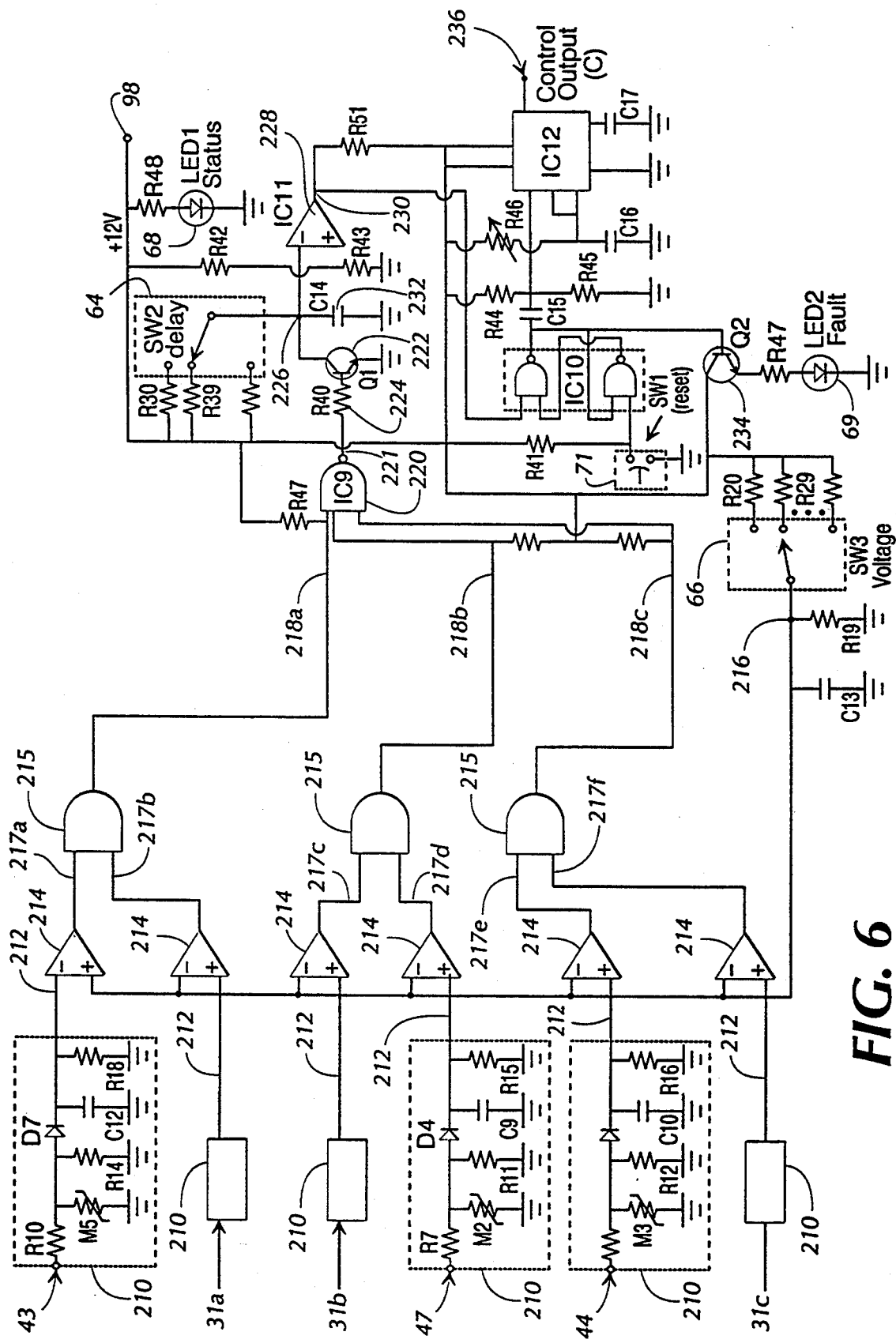
FIG. 6 is a schematic diagram of another portion of the control circuit of the downed conductor transmitter of FIG. 2.

More of the control circuit 96 can be seen in FIG. 6. AC voltages from the secondary taps 43, 44 and 47 to the transformers of the distribution system, are first filtered and rectified by filter/rectifiers 210 to produce a DC voltage 212 proportional to the AC voltage level present on those lines. Where potential devices 23a, 23b and 23c are provided, three additional filter/rectifier circuits 310 are provided. Voltage comparators 214 compare DC voltages 212 to a preselected voltage threshold 216 preselected by use of switch 66. When a DC voltage 212 falls below voltage threshold 216, its associated comparator 214 outputs a low voltage on line 218. Where redundancy is preferred, the outputs from each associated distribution transformer and potential device through comparators are paired as inputs to an AND Gate 215. The output from the AND Gates 215 will be high only if a reduction in voltage is detected over both the distribution transformer and the potential device which are paired together. All three AND Gate outputs 218 are input to NAND gate 220. Any low output from any AND Gate 214 will cause NAND gate 220 to output a low voltage on line 221. Line 221 connects to the base of transistor 222 through resistor 224. Normally, line 221 is high, approximately 5 V, applying 5 V to the base of transistor 222, thereby turning transistor 221 ON and setting tie point 226 at almost 0 V. Tie point 226 is an input to comparator 228.

The output 230 of comparator 228 is normally high because the input 226 is normally below the DC voltage threshold applied to its positive terminal. However, when 221 goes low, transistor 222 is turned OFF and begins charging capacitor 232. The charging time of capacitor 232 is determined by the delay threshold selected by delay threshold selector 64. Depending upon the delay selected by BCD delay switch 64, a different value resistor is placed in series with capacitor 232, thereby varying the charge time. When capacitor 232 charges up, the voltage at 226 exceeds the reference at the positive terminal of comparator 228, thereby causing comparator output 230 to go low. If during this period the monitored voltages are restored, the process is interrupted by the turning ON of the transistor 222 and subsequent discharge of capacitor 232.

In response to a low on 230, timer IC12 is triggered placing a high voltage on 236 the control output. Reset switch 71 resets timer IC12 by applying O/V to the set input of a Master-Slave Flip Flop IC10, thereby causing the voltage at 236 to return to O/V.

Normally, fault light 69 is off because normally high output of comparator 228 causes low voltage on the base of transistor 234 and keeps current from flowing through transistor 234, reverse biasing the fault light. Fault light 69 lights when the voltage at 230 goes high, allowing current to flow through the emitter of transistor 234, thereby forward biasing fault light 69 at the same time output 230 goes high.

The cathode of status light 68 is connected to 12VDC supply 98 through a resistor and the anode is connected to ground. Thus, status light 68 will be forward biased and light emitting so long as the 12VDC supply 98 is charged.

For single phase application, as illustrated in FIG. 1a, only one pair of filter/recitifier circuits 210 are necessary for receiving taps from the secondaries of transformer 27 and potential device 17. The output of each of the two filter/rectifier circuits 210 would then go to its own comparator 214. The output of the two comparators 214 would lead to an AND Gate which, when both comparators recognize a reduction in voltage occuring at transformer 27 and potential device 17, provides an input directly to resistor 224 and transistor 222.

Figure 7:
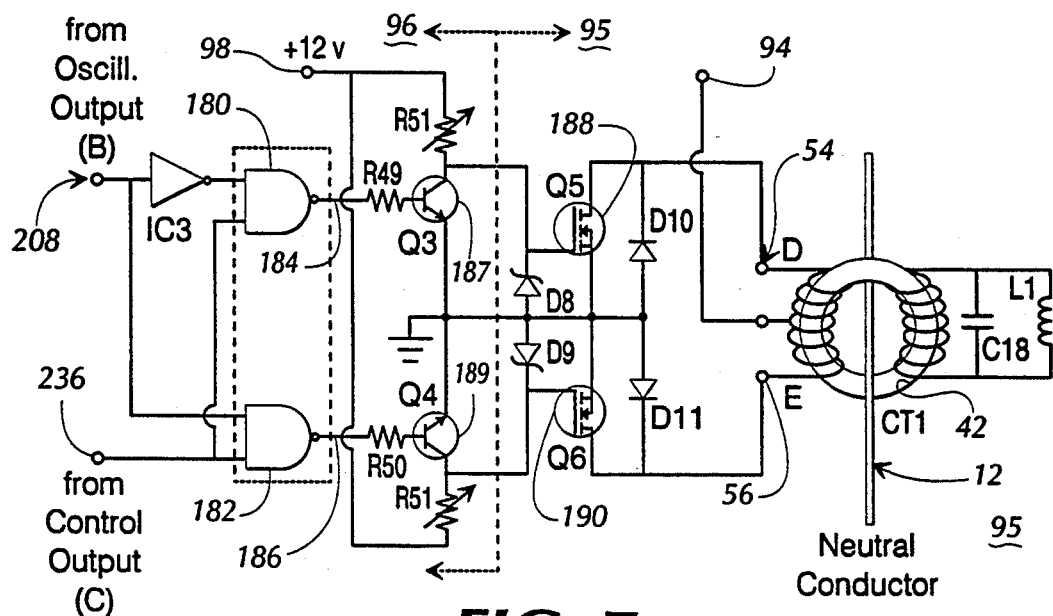
FIG. 7 is a schematic diagram of another portion of the control circuit and the power circuit of the downed conductor transmitter of FIG. 2.

The circuitry in FIG. 7 develops the AC voltages necessary to inject signal 18 into neutral conductor 12 using current tapping transformer 42. Signal injection device reference frequency 208 and control output 236 are applied to the input of two NAND gates 180 and 182. Control output 236 is named the control output because so long as it is low the outputs 182 and 184 of NAND gates 180 and 182 will remain high, regardless of whatever activity is taking place on line 208. However, once timer IC12 is triggered, line 236 goes high allowing the outputs 184 and 186 to toggle according to the frequency of oscillator output 208. Output 184 will be 180° out of phase with output 186 because oscillator output 208 is inverted by an inverter before it is input to NAND gate 180.

When output 184 is high, transistors 187 and 188 conduct, closing the circuit 56-94 thereby causing current to flow in the winding of current tap transformer 42 from 94 to 56. Similarly, when the output 186 of NAND gate 182 is high, transistors 189, and 188 are conductive, thereby closing the circuit 54-94. This causes current to flow in the opposite direction through the winding on current transformer 42, from 94 to 54. Thus, an AC signal is injected into neutral conductor 12 which has the same frequency as transmitter reference frequency 208. The amplitude is attenuated as the signal propagates along neutral conductor 12 so that the signal received by the receiver 16 is actually a low current pulse.

On the opposite winding of current tapping transformer 42 is a tank circuit created by capacitor C18 and inductor L1, which filters out the power frequency (60 Hz) currents. The same type of tank circuit is provided on current tapping transformer 79 to prevent the propagation of the signal injected into the neutral beyond that point, the tank circuit being designed to absorb the signal frequency propagated.

Figure 8:
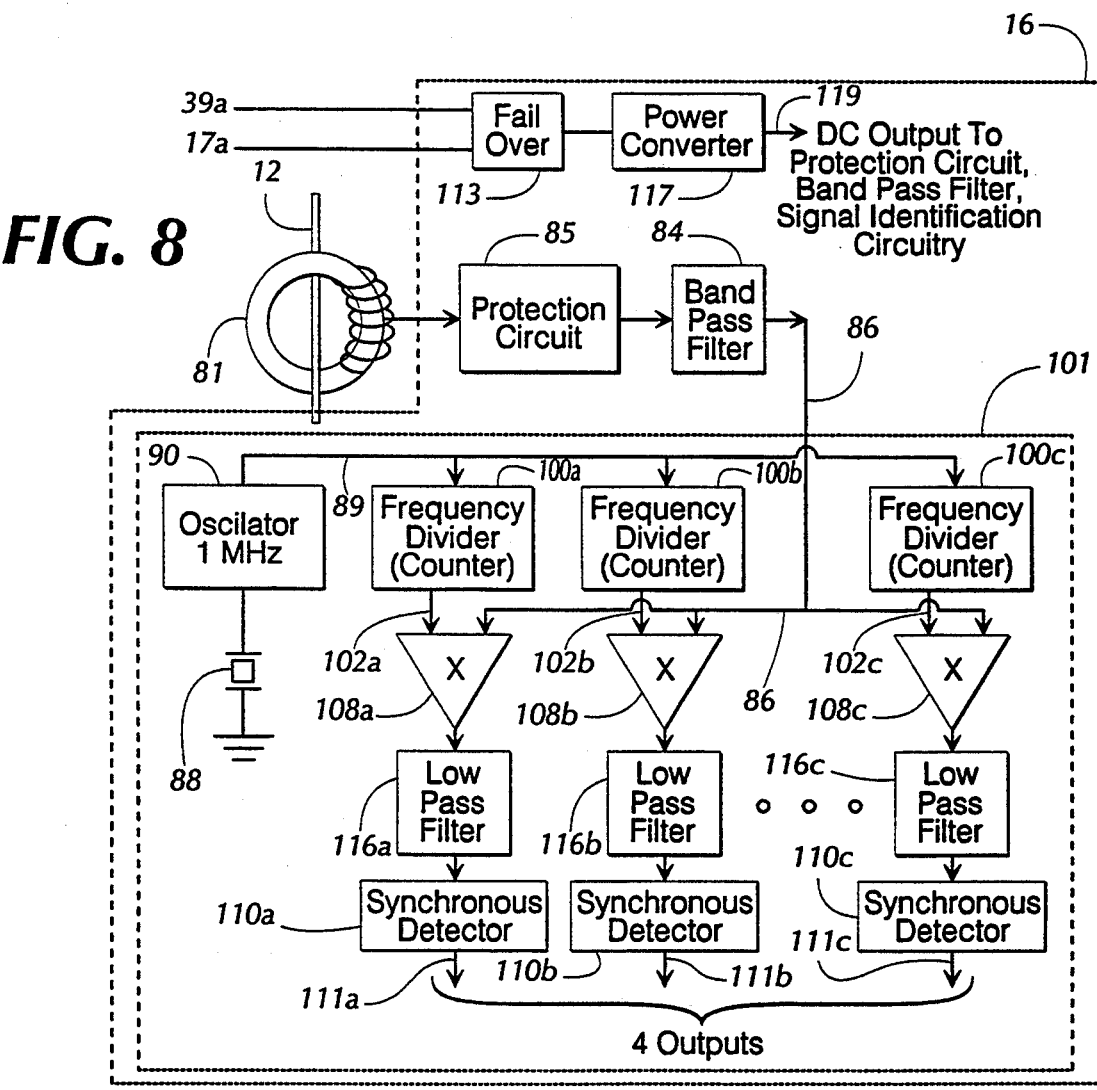
FIG. 8 is a block diagram of the downed conductor receiver.

Turning to FIG. 8, receiver 16 consists of surge protection circuit 85, bandpass filter 84 and signal identification circuitry 101 and power supply circuitry. The power supply circuitry of receiver 16 consists of a fail over 113 in series with a power converter 117. Fail over 113 receives AC power from both the series tap 39a from potential device 27a and the secondary tap 17a from distribution transformer 29a. Fail over 113 is a conventional device which automatically switches power to one source when another fails. Thus, power converter 117 receives power regardless of failures on potential device 27 or distribution transformer 28. Power converter 117 converts AC voltages into the DC levels 119 used by the remainder of receiver 16. Receiver 16 detects an injected signal or pulse 18 on neutral conductor 12 using current tapping transformer 81. The tap from current transformer 81 is fed to surge protection circuit 85, which attenuates any high voltage transients and passes it's output to bandpass filter 84. Bandpass filter 84 passes only frequencies within the expected range of transmitter outputs, i.e. between 5 and 15 KHz. Bandpass filter 84 output 86 is then fed to signal identification circuit 101.

In the embodiment shown in FIG. 8, signal identification circuit 101 includes four outputs. The number of outputs is determined by the number of transmitters receiver 16 serves. Those skilled in the art will understand that the circuitry shown is easily modified to accommodate any number of transmitters and any number of outputs.

Signal identification circuit 101 determines which transmitter transmitted the trip signal. Signal identification circuit 101 accomplishes this by generating the reference frequency of each transmitter which it serves. These reference frequencies are generated in exactly the same fashion in which they are generated in transmitter 22 as illustrated in FIG. 5. A 1MHZ frequency signal is generated using a standard IC oscillator 90 with a reference quartz crystal 88. The 1MHZ output from oscillator 90 is then provided to a number of frequency dividers 100a, 100b, 100c, etc, that divide the 1MHz reference frequency 89 to develop a unique transmitter reference frequency. The output of each frequency divider is then fed to a multiplier 108a, 108b, etc. Where it is multiplied by the band pass filter's output 86. The multiplier output will have a DC signal only if exactly the same frequencies are inputs to the multiplier. The multiplier output is filtered through its associated low pass filter 116a, 116b, 116c. The output of each low pass filter will be non-zero only when a signal of precisely the design frequency is detected. In this case, the non-zero filtered output passes onto its associated synchronous detector 110a, 110b, 110c. The output of the synchronous detector is a trip signal which activates the desired interrupt device.

Figure 9:
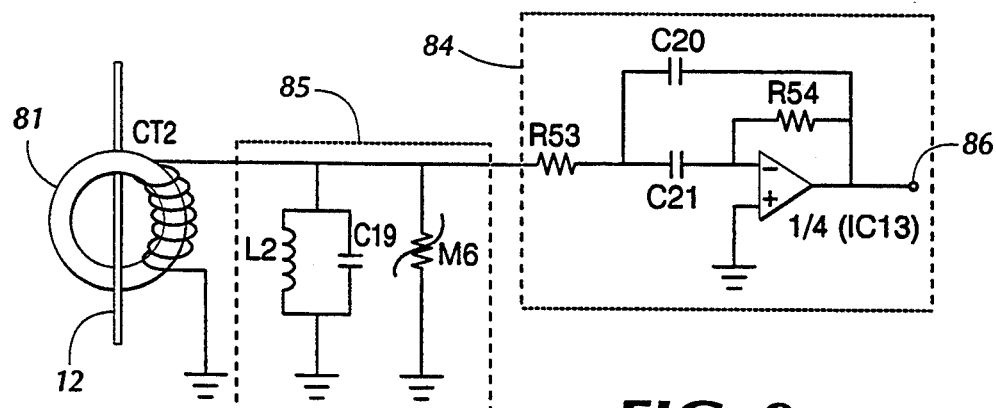
FIG. 9 is a schematic diagram of the receiver's input surge protection and band pass filter circuits.

Turning now to FIG. 9 the surge protection circuitry 85 and band pass filter 84 of receiver/detector 16 can be seen. The output from current tapping transformer 81 is fed to surge protection circuit 85, which includes a notch filter to eliminate any 60Hz components found on neutral conductor 12. Surge protection circuit 85 also includes a metal oxide varistor M6 which attenuates any large voltage spikes detected on neutral conductor 12.

The output of protection circuit 85 is then fed to bandpass filter 84. Bandpass filter 84 is a conventional active filter with two poles. Bandpass filter 84 allows only those frequencies used by the transmitters to be passed onto signal identification circuit 101.

Figure 10:
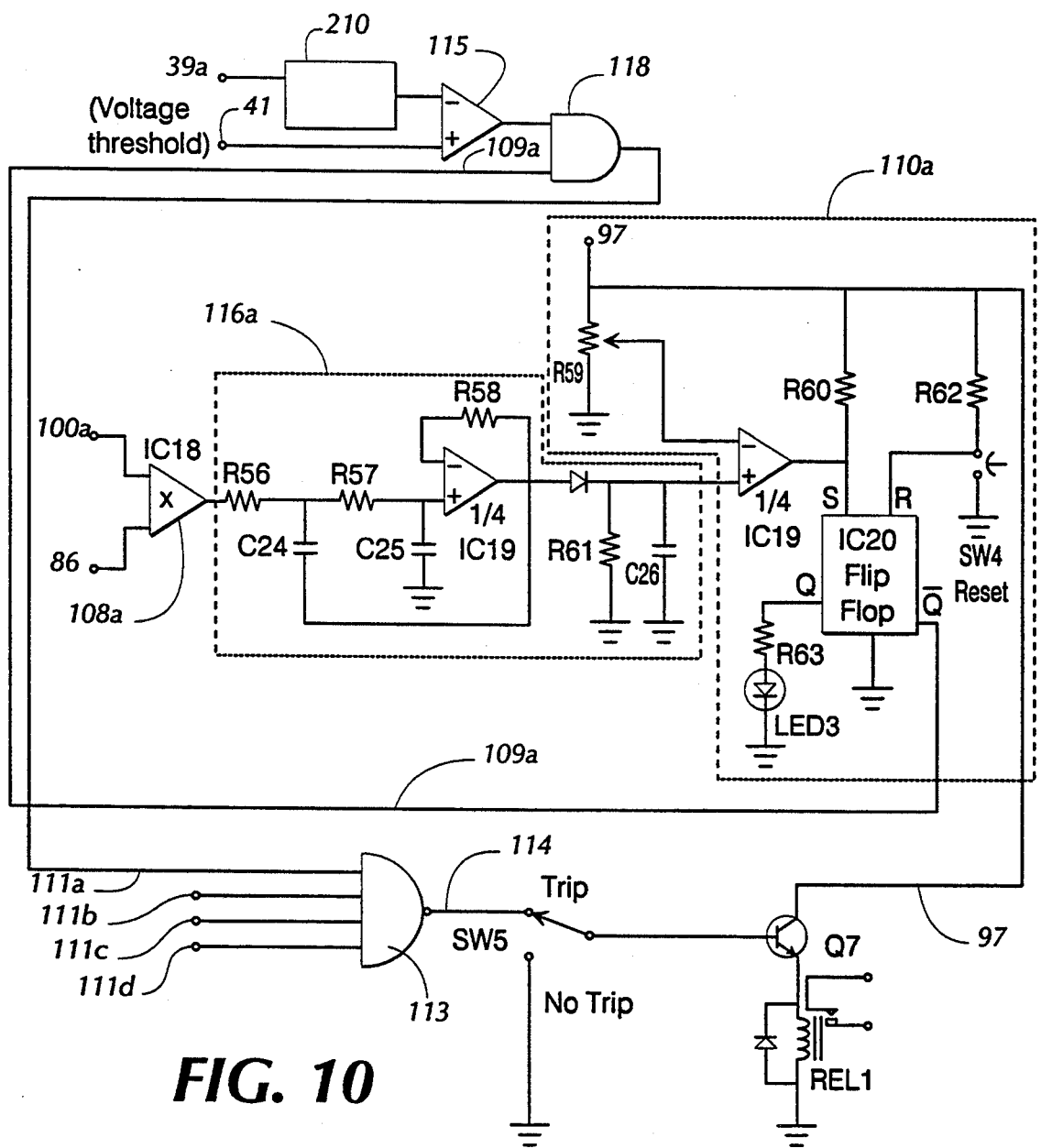
FIG. 10 is a block diagram of the receiver's synchronous detector and activation circuitry.

A detailed circuit diagram of one of the plurality of parallel legs including, for example, multiplier 104, low pass filter 116a and synchronous detector 110a used in the receiver 16 can be seen in FIG. 10 along with the circuitry to generate a trip signal to activate a current interruption device. The output of low pass filter 116a is fed to a synchronous detector 110a. A non-zero output from multiplier 108a goes through filter 116a to trigger flip-flop IC20. When triggered flip-flop IC20 will light LED 3 indicating that a fault has been detected. LED 3 uniquely corresponds to a transmitter and, thus, identifies the transmitter which has outputted the signal. Flip-flop IC20 also develops a low voltage output on line 109a. The output on 109a is fed to AND Gate 118 as one input. The other input to Gate 118 being the output from comparator 115 which compares a reference voltage generated in the same form as in FIG. 6 to the input from a tap 39a on series transformer of potential device 27a through a filter/rectifier circuit analogous to filter/rectifier circuit 210 of FIG. 6. In this manner redundancy is again provided. The output from each AND Gate is input to NAND gate 113. The output of NAND gate 113, line 114, is normally low because the normal output of each synchronous detector is a high. When any synchronous detector outputs a low on its output line 111a, 111b, 111c, the NAND output 114 goes high allowing current to flow through transistor Q7 tripping relay REL1. The activation of relay REL1 will send a trip signal to operate an associated current interruption device, which may be a ground switch, a recloser, a circuit breaker, a fuse cutout or other current interruption device.

Switch SW5 is a manual switch for use in conjunction with test button 70, to prevent the generation of a trip signal to the desired interruption device when a fault condition is signalled. Use of switch SW5 to prevent activation of relay REL 1 is desired when using the test mode of the system so as to avoid inadvertent interruption of supply to customers during testing.

Since the present invention is designed for one-shot operation, a reset mode is provided for both the transmitter and the receiver operated by way of reset button 71 illustrated in FIGS. 2 and 6 and reset button SW4 in FIG. 10.

Figure 11:
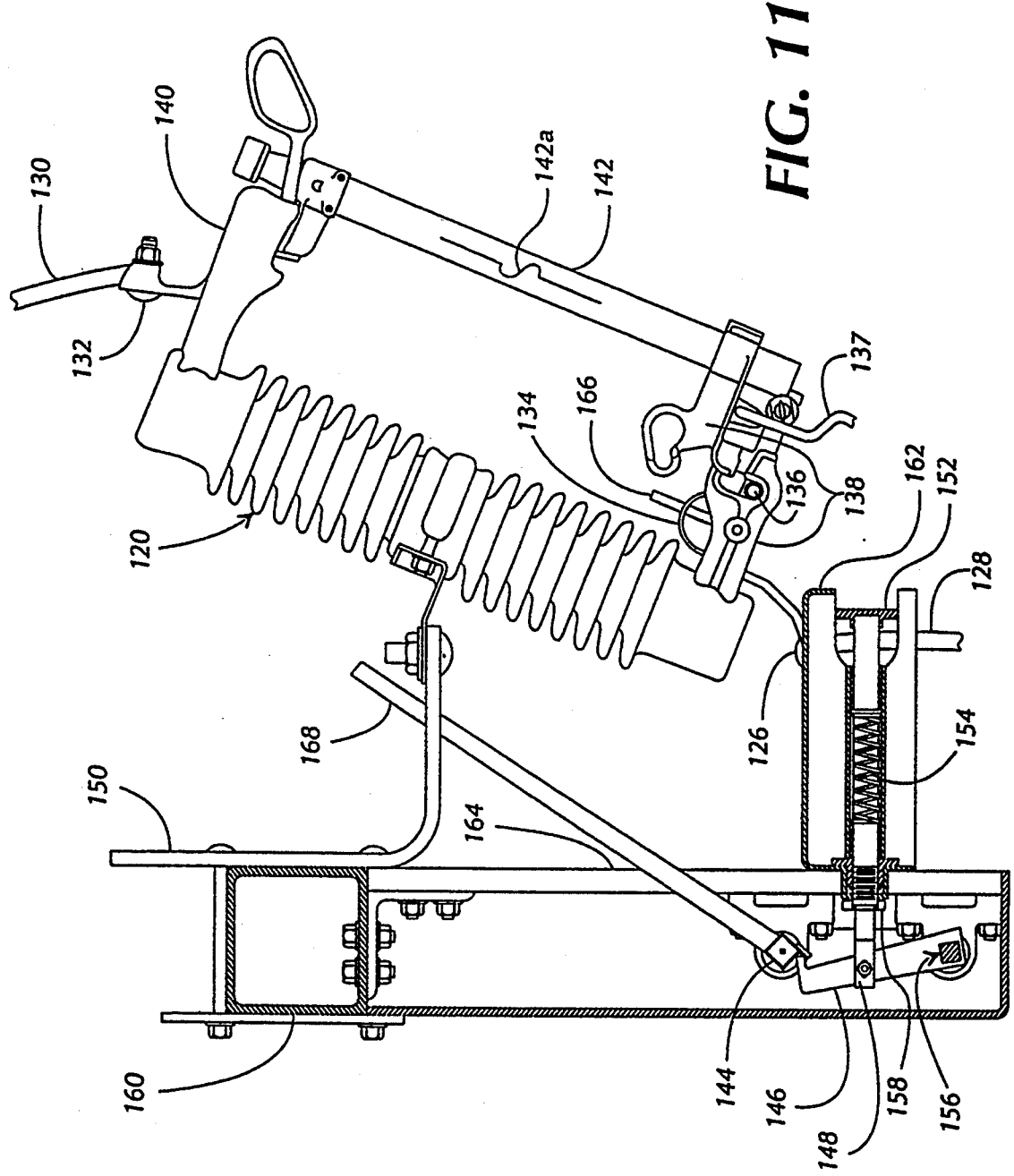
FIG. 11 is a side elevational view of a three phase cutout of the present invention mounted to a power pole.
Figure 12:
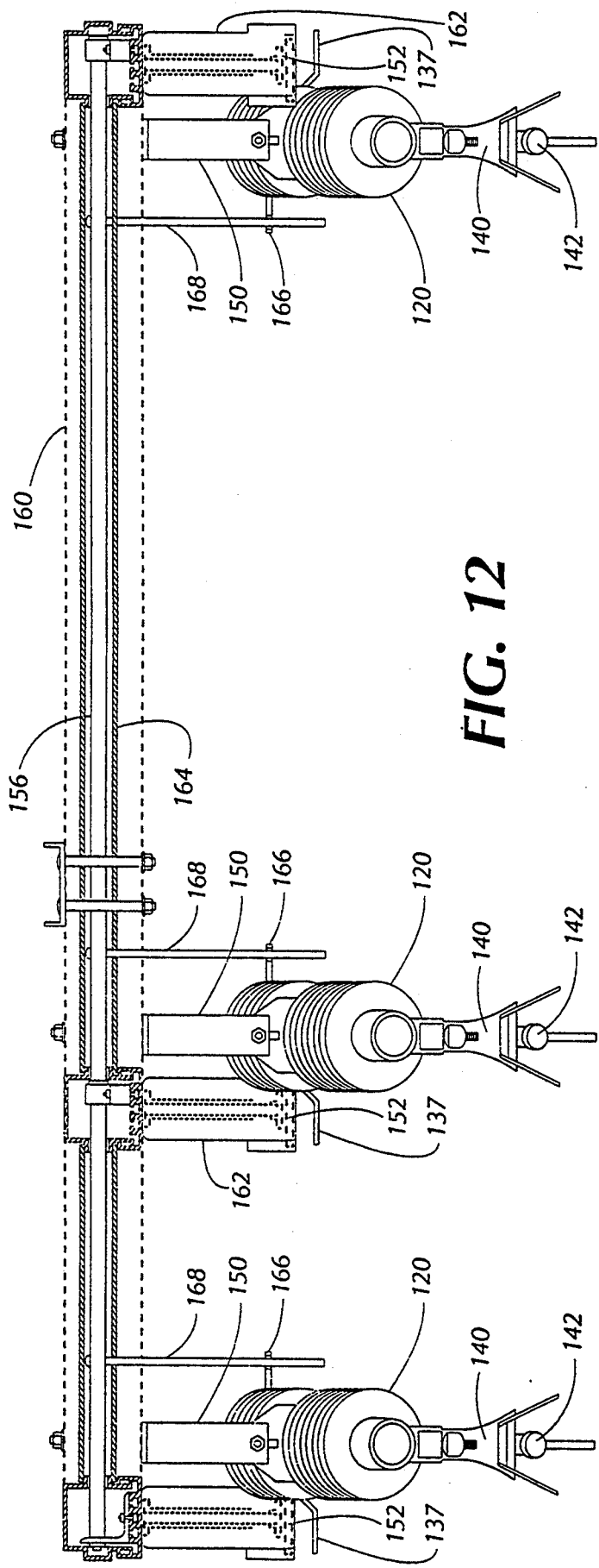
FIG. 12 is a top plan view of the three phase cutout of FIG. 11.

Turning now to FIGS. 11 and 12, a three phase fuse cutout can be seen, which may be used in conjunction with the downed conductor apparatus to open the circuits to all three phases simultaneously. The purpose of this cutout is to provide three phase circuit opening for any condition of one or more open conductors or a single fuse link in the cutout blowing for any reason. Thus, single phasing in a three phase customer's circiut may be avoided.

The three phase fuse cutout includes three individual and essentially identical fuse cutout assemblies 120 mounted on a cross-arm 160 by mounting brackets 150. Mounting brackets 150 and the housing 164 hold the three fuse cutouts 120 in a parallel spaced apart relationship along cross-arm 160. Each fuse cutout assembly 120 includes an upper electrode 140, a lower electrode assembly 138 and a fuse holder 142, that holds fuse link 142a. Lower electrode assembly 138 includes pivot 136 about which the assembly may rotate. The lower electrode assembly 138, and thus the fuse holder 142, is prevented from rotating about pivot 136 by a spring catch (not shown) inside upper electrode 140 which maintains tension on fuse holder 142 when fuse holder is in place in an upright position as shown. Attached to lower electrode assembly 138 and extending to one side thereof is a grounding contact 166. Attached to the bottom of lower electrode assembly 138 and extending to the side opposite grounding contact 166 is an arm 137 for sriking the head of plunger 152.

As can be seen in FIG. 12, the three fuse cutout assemblies 120 are mounted in a parallel spaced apart relationship to housing 164 which is mounted to a cross-arm 160 of a power pole (not shown). Each fuse cutout 120 is attached to the cross-arm 160 and the three phase housing 164 by a mounting bracket 150 and a screw. Extending generally below and to the side of each fuse cutout 120 and operatively associated therewith is a plunger guard 162, which houses plunger 152 and plunger spring 154. Plunger guard 162 adjoins fuse cutout 120 on the side opposite grounding contact 166. Plunger guard 162 is a generally rectangular shaped cavity extending generally perpendicularly from three phase housing 164 towards cutout assembly 120. Plunger 152 extends the length of plunger guard 162, running substantially through the center of guard 162. Encircling plunger 152 is spring 154, which outwardly biases plunger 152 while fuse cutout 120 is conductive. One end of plunger 152 is headed and located nearest to fuse cutout 120. The opposite end of generally cylindrically shaped plunger 152 is attached to operating arm 146 by a screw at pressure point 148.

Operating arms 146 are substantially rectangular in shape, being slightly wider at one end and tapering down toward its opposite end, which has a slight lip. When the fuse cutout 120 is conductive, the lip of each operating arm 146 is wedged against a switch blade shaft 144, thereby latching each grounding arm 168 above an associated grounding contact 166 and preventing rotation of the grounding arm 168 about shaft 144.

Each larger end of all three operating arms 146 has a hole through which latch rod 156 extends. The fit between the cross section of latch rod 156 and the hole through operating arm 146 is such that when one of the two rotates, the other necessarily rotates.

On the opposite side of each fuse cutout 120, extending below and in a parallel spaced apart relationship to the mounting brackets 150 is grounding arm 168. Grounding blade 168 is a long thin member made of any metallic or electrically conducting material, capable of withstanding large amplitude currents. Each grounding arm 168 is attached to latch rod 156 at one end. The opposite end of each grounding arm 168 is normally above, but not in contact with, its associated grounding contact 166 when the fuse cutout 120 is conductive.

When conductive, electrical current flows into the fuse cutout 120 through line lead 130 to lead terminal 132 and from there through upper electrode 140 and through the fuse link 142a contained in fuse holder 142. From the fuse link 142a, current flows through lower electrode assembly 138 to the service terminal 126 and from there to the service lead 128, which connects to a power customer's facilities. The lower electrode assembly 138 is prevented from rotating about pivot 136 by fuse holder 142.

In response to an overcurrent condition, fuse link 142a melts and the spring tension on fuse holder 142 causes lower electrode assembly 138 to rotate about pivot 136. This downward rotation causes arm 137 to strike the head of plunger 152 overcoming spring 154 pushing plunger 152 inwardly within plunger guard 162. The inward movement of plunger 152 pushes operating arm 146 rotating it away from switch blade shaft 144. The rotation of arm 146 causes latch rod 156 to rotate, freeing all three grounding arms 168 to rotate about shaft 144 and contact their associated grounding contact 166, thereby initiating a high current ground fault to promptly melt all unblown fuse links 142a interrupting the current flowing through all remaining leads 128.

The three phase fuse cutout can also be solenoid activated by a downed conductor receiver of the present invention. Each fuse cutout 120 has an associated solenoid, for example, solenoids 15a, 15b, 15c of FIG. 1b, which when activated may move a plunger 152 or an operating arm 146, thereby initiating the interruption of current to all three phases. It is now seen that the three phase fuse cutout provides a three phase response to two different single phase faults, a blown fuse on a single phase or one single downed conductor.

Each fuse cutout 120 can be restored to its ready, inoperative state by the following procedure. First, each fuse holder 142 is removed using a hotstick. The fuse links contained in the fuse holders 142 are then replaced. Next, using a hotstick the switch blade shaft 144 is rotated back into a latched position against operating arms 146. Finally, fuse holders 142 are placed back onto fuse cutout 120.

Figure 13A:
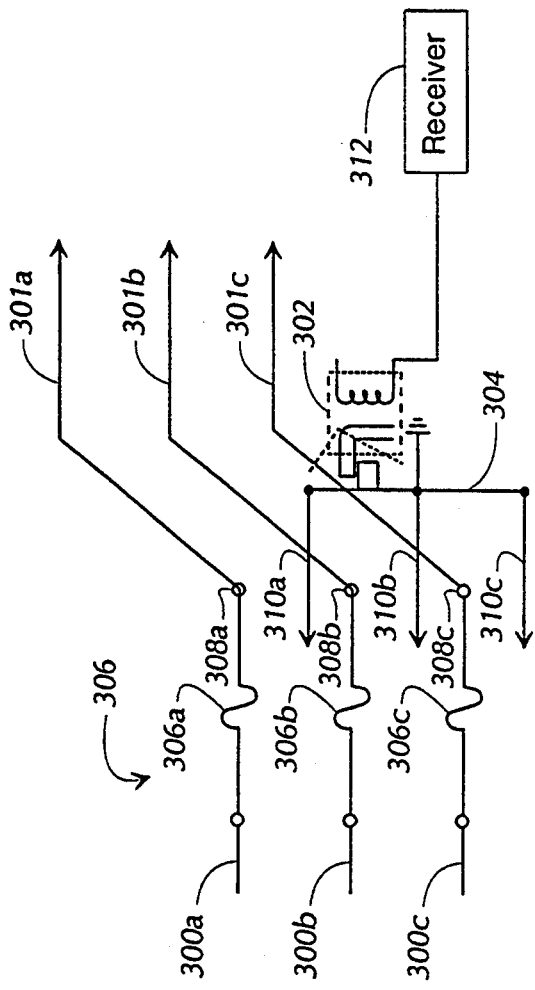
FIGS. 13a–c are circuit diagrams depicting alternate circuit interruption means which may be used in conjunction with the receiver/detector of the present invention.
Figure 13B:
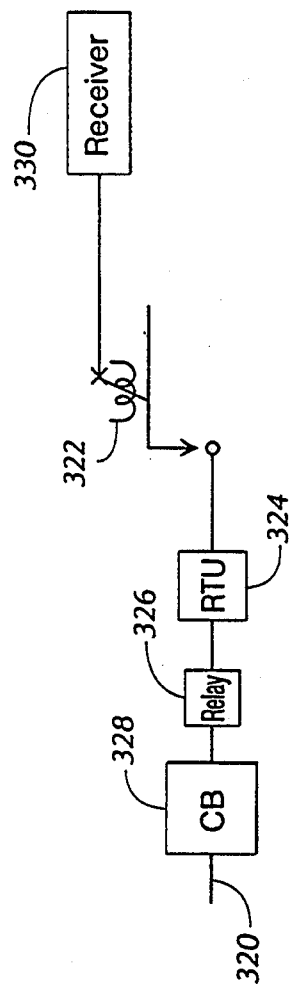
Figure 13C:
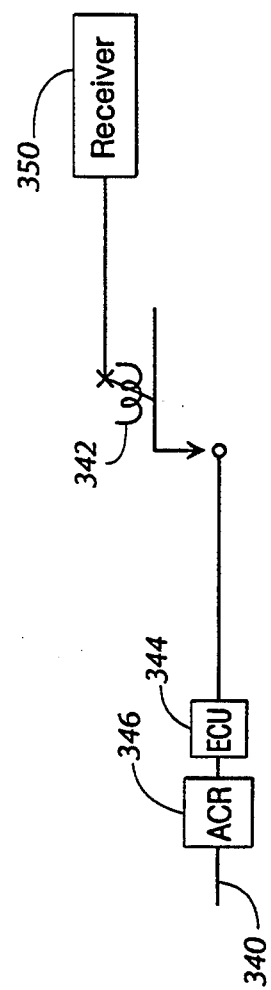

Turning to FIGS. 13a, 13b and 13c, alternate means of causing an opening in the circuit or circuits to a phase conductor or conductors using the down conductor apparatus of the present invention can be seen. FIG. 13a illustrates the use of the three phase fuse cutout 306, as illustrated, for example, in FIGS. 11 and 12, in cooperation with the receiver/detector 312 of the present invention. Each one of the single phase fuse cutouts 306a, 306b or 306c of the three phase cutout is inserted in series with each phase conductor 300a, 300b and 300c of a three phase distribution line. Normally, grounding arms 310a, 310b and 310c are spaced above grounding contact 308a, 308b and 308c, so that current flows from phase conductors 300a, 300b, 300c, through fuse cutouts 306a, 306b, 306c to service lines 301a, 301b and 301c. When receiver 312 outputs an activation signal, solenoid 302 operates causing latch rod 304 to rotate. Grounding arms 310a, 310b and 310c rotate downwardly contacting grounding contacts 308a, 308b and 308c in response to the movement of latch rod 304. The circuits to service conductors 301a, 301b and 301c are thereby opened and current flow interrupted.

FIG. 13b illustrates the use of a circuit breaker 328 in conjunction with the receiver/detector 330 of the present invention to interrupt current flow. The system illustrated consists of circuit breaker 328, relay 326, and remote terminal unit (RTU) all inserted in series with single phase conductor 320. Current flow through phase conductor 320 is interrupted when receiver/detector 330 actiavates solenoid 322. The operation of solenoid 322 causes RTU 324 to open relay 326, which in turn causes circuit breaker 328 to open, interrupting current flow through a three phase conductor circuit 320 (shown as a single line). Those skilled in the art will understand that the system of FIG. 13b is typically a three phase distribution system incorporating three relays, three circuit breakers, and three RTU's and solenoids, all of which would be controlled by a single receiver/detector.

FIG. 13c illustrates yet another means of interrupting current through a three phase circuit (shown as a single line) 340 using the receiver/detector 350 of the present invention. The system shown includes an automatic circuit recloser (ACR) 346, and its associated electronic control unit (ECU) 344. Normally, ACR 346 is closed allowing a current to flow through conductor system 340. Receiver/detector 350 triggers solenoid 342, which in turn signals cause the opening of. ECU 344 ACR 346, thereby opening the circuit to which three phase conductor system 340 was connected. The system shown may also be modified to interrupt current in a single phase distribution system by providing an ACR, an ECU and a solenoid to each phase.

It will now be obvious to those skilled in the art that many variations may be made in the embodiment chosen for the purpose of illustrating the best mode of making and operating the present invention, without departing from the scope thereof as defined by the appended claims.

We claim:

1. A method of de-energizing an outdoor overhead electric power distribution conductor, comprising the steps of:
   monitoring the voltage at the power distribution conductor to detect a reduction in voltage indicating an opening in the power distribution conductor;
   outputting a current pulse signal into a distribution current neutral conductor in response to having detected a reduction in voltage in the power distribution conductor;
   detecting the outputted current pulse signal; and
   de-energizing the power distribution conductor in response to the detected signal.

2. The method of claim 1, wherein said step of detecting a fault in said power conductor includes generating a reference signal representative of a voltage level less than 100% of the normal operating voltage in said power conductor and comparing the voltage monitored at said conductor to said reference signal.

3. The method of claim 1, wherein said power conductor has an associated neutral conductor and injecting the outputted signal into the neutral conductor.

4. The method of claim 3, further comprising the step of assigning a selected frequency for the signal to be injected into the neutral conductor and propagating the signal in the neutral conductor having said selected frequency.

5. The method of claim 3, wherein the step of injecting a signal into the neutral conductor includes injecting said signal through a current transformer.

6. The method of claim 5, further comprising the step of saturating the current transformer against high short-circuit currents in said neutral conductor due to power faults when injecting said signal.

7. The method of claim 1, further comprising the step of selecting a time delay period for detection of said reduction in voltage.

8. The method of claim 1, further comprising the step of generating a reference signal having the same frequency as that assigned to the signal outputted and comparing said reference signal to the detected signal.

9. The method of claim 8, further comprising the step of filtering the detected signal prior to comparing said detected signal to said reference signal.

10. The method of claim 1, further comprising the step of storing energy to be used in outputting said signal.

11. The method of claim 1, wherein the power conductor is one of a number of power conductors in a network of power conductors.

12. The method of claim 1, wherein the step of activating an interuption device includes activating an interuption device selected from the group consisting of ground switches, reclosers, fuse cutouts and circuit breakers.

13. The method of claim 1, further comprising the step of encoding the outputted signal according to a location where the fault in the power conductor was detected.

14. The method of claim 11, further comprising the step of activating a multiplicity of interruption devices to open the power conductors in said network of power conductors in response to the detected signal.

15. The method of claim 1, wherein said outputted signal serves to close a contact in a communications link.

16. The method of claim 15, wherein the communications link is selected from the group consisting of fiber optic cables, telephone lines and radio frequency links.

17. An apparatus for de-energizing an outdoor overhead electric power distribution conductor comprising:
means for detecting a reduction in voltage in the power distribution conductor indicating an opening in the power distribution conductor;
means for outputting a current pulse signal into a distribution current neutral conductor in response to having detected a reduction in voltage in the power conductor;
means for detecting the outputted current pulse signal, and
means for activating an interruption device in response to the detected current pulse signal to de-energize the power distribution conductor.

18. The apparatus of claim 17, further comprising means for encoding the signal prior to outputting it according to a location where the fault in the power conductor was detected.

19. The apparatus of claim 17, wherein the power conductor is one of a number of power conductors in a network of power conductors.

20. The apparatus of claim 19, wherein the activating means activates a multiplicity of interruption devices in response to the detected signal to interrupt the current flow through a multiplicity of power conductors.

21. The apparatus of claim 17, wherein said power conductor has an associated neutral conductor and the means for outputting a signal responds to the detected reduction at the voltage in said power conductor by injecting the signal into the neutral conductor.

22. The apparatus of claim 21, wherein the means for detecting the outputted signal detects the signal by monitoring the neutral conductor.

23. Thee apparatus of claim 17, wherein the means for outputting a signal responds to the detected reduction at the voltage in said power conductor by transmitting a radio frequency signal.

24. The apparatus of claim 23, wherein the means for detecting the outputted signal detects the signal by receiving the radio frequency signal.

25. The apparatus of claim 17, wherein the means for outputting a signal responds to the reduction in the voltage at the power conductor by outputting a signal into an optical fiber.

26. The apparatus of claim 25, wherein the means for detecting the outputted signal detects the signal by monitoring the optical fiber.

27. The apparatus of claim 17, wherein the means for outputting a signal responds to the reduction in the voltage at the power conductor by outputting the signal to a telephone line.

28. The apparatus of claim 27, wherein the means for detecting the outputted signal detects the signal by monitoring the telephone line.

29. The apparatus of claim 17, wherein said means for detecting a fault in said power conductor includes a means for generating a reference signal representative of a voltage level less than 100% of the normal operating voltage in said power conductor and a means for comparing the voltage monitored at said conductor to said reference signal.

30. The apparatus of claim 17, further comprising means for assigning a selected frequency for the outputted signal.

31. The apparatus of claim 21, wherein the means for outputting a signal in the neutral conductor includes injecting said signal through a current coupling device.

32. The apparatus of claim 21, further comprising means for saturating the current transformer against high short-circuit currents in said neutral conductor due to power faults when outputting said signal.

33. The apparatus of claim 17, further comprising means for selecting a time delay period for detecting the reduction in voltage.

34. The apparatus of claim 17, further comprising means for generating a reference signal having the same frequency as that assigned to the signal outputted and means for comparing said reference signal to the detected signal.

35. The apparatus of claim 34, further comprising means for filtering the detected signal prior to comparing said detected signal to said reference signal.

36. The apparatus of claim 17, further comprising the step of storing energy to be used in outputting said signal.

37. The apparatus of claim 17, wherein the means for activating an interruption device includes interruption devices selected from the group consisting of ground switches, reclosers, fuse cutouts and circuit breakers.

38. The apparatus of claim 19, further comprising means for activating a multiplicity of interruption devices to open the power conductors in said network of the power conductors in response to the detected signal.

39. A system for detecting a high impedance fault in a phase conductor, a potential device being connected to said phase conductor, comprising:
   a signal injection device having an input from the potential device and having means for detecting a reduction in voltage at the phase conductor and means for outputting a signal in response to having detected a
   a signal receiver for receiving said outputted reduction in voltage at the phase conductor; and signal and providing a second signal to an interruption device in response to having received said outputted signal to cause the interruption device to open the circuit to said phase conductor.

* * * * *